US00RE43853E

(19) United States
(12) Reissued Patent
Jo

(10) Patent Number: US RE43,853 E
(45) Date of Reissued Patent: Dec. 11, 2012

(54) METHOD FOR CONCEALING DARK DEFECT IN IMAGE SENSOR

(75) Inventor: Wan-Hee Jo, Seoul (KR)

(73) Assignee: Intellectual Ventures II LLC, Wilmington, DE (US)

(21) Appl. No.: 12/713,040

(22) Filed: Feb. 25, 2010

Related U.S. Patent Documents

Reissue of:
(64) Patent No.: 7,336,850
Issued: Feb. 26, 2008
Appl. No.: 11/097,852
Filed: Mar. 30, 2005

(30) Foreign Application Priority Data

Apr. 27, 2004 (KR) ..... 10-2004-0029070

(51) Int. Cl.
*G06K 9/00* (2006.01)

(52) U.S. Cl. ..... 382/275; 382/141; 382/270; 382/274; 348/246; 702/17; 702/191

(58) Field of Classification Search ..... None
See application file for complete search history.

(56) References Cited

U.S. PATENT DOCUMENTS

| | | | | |
|---|---|---|---|---|
| 4,579,455 | A * | 4/1986 | Levy et al. | 356/394 |
| 6,829,381 | B2 * | 12/2004 | Levin et al. | 382/149 |
| 2001/0033683 | A1 * | 10/2001 | Tanaka et al. | 382/149 |
| 2002/0126299 | A1 * | 9/2002 | Buchar et al. | 358/1.9 |
| 2003/0012452 | A1 * | 1/2003 | Trifonov et al. | 382/275 |
| 2003/0228045 | A1 * | 12/2003 | Asai et al. | 382/141 |
| 2005/0249417 | A1 * | 11/2005 | Song et al. | 382/199 |
| 2008/0055434 | A1 * | 3/2008 | Ovsiannikov | 348/246 |

FOREIGN PATENT DOCUMENTS

| | | |
|---|---|---|
| JP | 4-345383 | 12/1992 |
| JP | 11-239298 | 8/1999 |
| JP | 2001028711 | 1/2001 |
| JP | 2002354340 | 12/2002 |
| JP | 2004023683 | 1/2004 |

OTHER PUBLICATIONS

Uncertified translation of Japanese Office Action dated Sep. 6, 2010.

* cited by examiner

*Primary Examiner* — John Lee
(74) *Attorney, Agent, or Firm* — McAndrews, Held & Malloy, Ltd.

(57) ABSTRACT

Disclosed is a method for concealing a dark defect in an image sensor. The method includes the steps of: setting a window including five sequential pixels from pixel data sequentially outputted, the third pixel and the fifth pixels being identical in Bayer color with each other and the second and the fourth pixels being identical in Bayer color with each other; calculating an average value $\alpha$ of the first and the fifth pixels and a plurality of $\alpha/n$ obtained by dividing the average value $\alpha$ by n; selecting one of the plurality of $\alpha/n$; comparing a threshold value $\alpha+\alpha/n$ calculated by adding the average value $\alpha$ to the selected $\alpha/n$ with a value of the third pixel in size; and omitting a concealment of the dark defect when the threshold value $\alpha+\alpha/n$ is greater than the value of the third pixel.

19 Claims, 6 Drawing Sheets

| | | | | |
|---|---|---|---|---|
| a | G | R | G | R |
| b | B | G | B | G |

a : G R G R G R ····· b : B G B G B G ·····

$$\frac{P_1 + P_5}{2} = \alpha$$

① $\alpha$ : $\frac{P_1 + P_5}{2}$

② $\alpha + \frac{\alpha}{2} = \frac{3}{2}\alpha$ : $\frac{3}{4}(P_1 + P_5)$

③ $\alpha + \frac{\alpha}{4} = \frac{5}{4}\alpha$ : $\frac{5}{8}(P_1 + P_5)$

| $P_1$ | $P_3$ | $P_5$ |
|---|---|---|
| 10 | 15 | 10 |

$$(P_3 = 15) > (\frac{5}{4}\alpha = 12.5)$$

$$\alpha = \frac{P_1 + P_5}{2} = 30$$

$$(P_3 = 50) > (\alpha + \frac{\alpha}{4} = 37.5)$$

METHOD FOR CONCEALING DARK DEFECT IN IMAGE SENSOR

Matter enclosed in heavy brackets [ ] appears in the original patent but forms no part of this reissue specification; matter printed in italics indicates the additions made by reissue.

FIELD OF THE INVENTION

The present invention relates to a method for concealing a dark defect in an image sensor; and more particularly, to a method for concealing a dark defect capable of being actively applied according to a pixel data.

DESCRIPTION OF RELATED ARTS

An image sensor is a device printing images by using a characteristic a semiconductor reacts to a light. That is, the image sensor is a device that a pixel detects a brightness and a wavelength of each different light coming from each different subject and reads the light in an electrical value. The image sensor plays a role in making this electrical value to a level capable of performing a signal processing.

Recently, a complementary metal oxide semiconductor (CMOS) image sensor having an excellent productivity due to a high scale of integration and a low consuming voltage has been more highlighted compared with a conventional solid camera device, i.e., a charge coupled device (CCD).

Meanwhile, a poor characteristic of the image sensor is a light signal reproduction in a low illuminated environment. It is because of an influence by a noise signal caused by a unique characteristic of the semiconductor device. This noise component degrades a ratio of a signal to a noise (SNR), thereby deteriorating an image quality.

Especially, in the low illuminated environment which the light signal is weakly entered to, an internal area should be increased, thereby increasing a signal composition entering. At this time, the noise composition is also increased with the same ratio and thus, a noise defect such as a spot is generated. Accordingly, it is called a dark defect.

SUMMARY OF THE INVENTION

It is, therefore, an object of the present invention to provide a method for concealing a dark defect generating a noise defect such as a spot prominently appeared in a low illuminated environment.

In accordance with one aspect of the present invention, there is provided a method for concealing a dark defect in an image sensor, including the steps of: setting a window including five sequential pixels, e.g., a first pixel $P_1$, a second pixel $P_2$, a third pixel $P_3$, a fourth $P_4$ and a fifth pixel $P_5$, from a plurality of pixel data sequentially outputted, the third pixel and the fifth pixels $P_3$ and $P_5$ being identical in Bayer color with each other and the second and the fourth pixels $P_2$ and $P_4$ being identical in Bayer color with each other; calculating an average value '$\alpha$' of the first and the fifth pixels $P_1$ and $P_5$ and a plurality of '$\alpha/n$' obtained by dividing the average value '$\alpha$' by 'n', 'n' being a multiple of 2; selecting one of the plurality of '$\alpha/n$'; comparing a threshold value '$\alpha+\alpha/n$' calculated by adding the average value '$\alpha$' to the selected '$\alpha/n$' with a value of the third pixel $P_3$ in size; and omitting a concealment of the dark defect when the threshold value '$\alpha+\alpha/n$' is greater than the value of the third pixel $P_3$.

In accordance with another aspect of the present invention, there is provided a method for concealing a dark defect in an image sensor, including the steps of: extracting a window including five sequential pixels, e.g., a first pixel $P_1$, a second pixel $P_2$, a third pixel $P_3$, a fourth $P_4$ and a fifth pixel $P_5$, from a plurality of pixel data sequentially outputted, the third and the fifth pixels $P_3$ and $P_5$ being identical in Bayer color with each other and the second and the fourth pixels $P_2$ and $P_4$ being identical Bayer color with each other; calculating an average value '$\alpha$' of the first and the fifth pixels $P_1$ and $P_5$ and a plurality of '$\alpha/n$' obtained by dividing the average value '$\alpha$' by 'n', 'n' being a multiple of 2; selecting one of the plurality of '$\alpha/n$'; comparing a threshold value '$\alpha+\alpha/n$' calculated by adding the average value '$\alpha$' to the selected '$\alpha/n$' with a value of the third pixel $P_3$ in size; judging an existence of an edge within the window by using the comparison result; and performing the concealment of the dark defect when the comparison result is affirmative.

BRIEF DESCRIPTION OF THE DRAWINGS

The above and other objects and features of the present invention will become better understood with respect to the following description of the preferred embodiments given in conjunction with the accompanying drawings, in which.

DETAILED DESCRIPTION OF THE INVENTION

Hereinafter, detailed descriptions on preferred embodiments of the present invention will be provided with reference to the accompanying drawings.

Figures 1, 2:
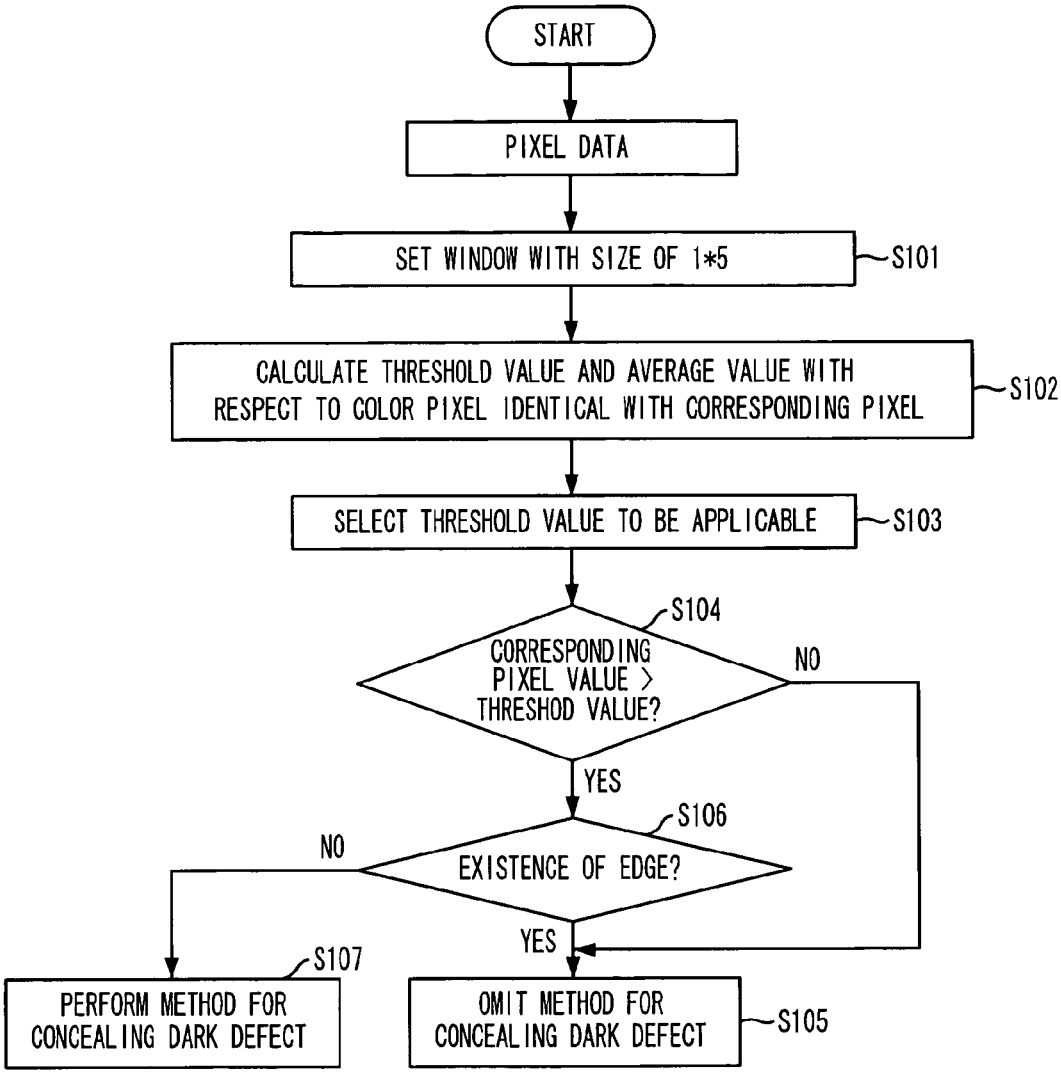
FIG. 1 is a flowchart schematizing a method for concealing a dark defect in accordance with the present invention.
FIG. 2 is a diagram for explaining an arrangement of pixels of a mosaic structure and a data format in accordance with the present invention.

FIG. 1 is a flowchart schematizing a method for concealing a dark defect in accordance with the present invention and FIG. 2 is a diagram for explaining an arrangement of pixels of a mosaic structure and a data format in accordance with the present invention.

With references to FIGS. 1 and 2, a method for concealing a dark defect in accordance with the embodiment of the present invention will be examined. Hereinafter, reference denotations, G, B and R denote a green color, a blue color and a red color, respectively.

The arrangement of the pixels uses a mosaic arrangement method illustrated in FIG. 2 and the pixel data are outputted in a series of sequential orders of GRGRGRGR and BGBGBGBGBG at two rows A and B.

Figure 3:
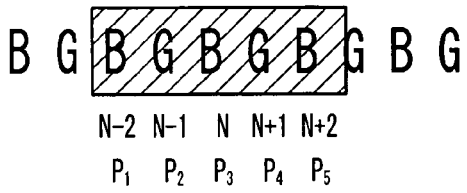
FIG. 3 is a diagram illustrating a window installed in the pixel data outputted in a series of sequential orders illustrated in FIG. 2.

FIG. 3 is a diagram illustrating a window installed in the pixel data outputted in the series of sequential orders illustrated in FIG. 2.

As a first step of the method for concealing the dark defect, a window (W) comprised of five sequential pixels from a plurality of pixel data sequentially outputted, i.e., a plurality of pixel data of a first pixel $P_1$ indicating B, a second pixel $P_2$ indicating G, a third pixel $P_3$ indicating B, a fourth pixel $P_4$ indicating G and a fifth pixel $P_5$ indicating B of the B row in FIG. 2, is set at step S101. Herein, a present pixel subjected to a dark defect discrimination among the first pixel $P_1$, the second pixel $P_2$, the third pixel $P_3$, the fourth pixel $P_4$ and the fifth pixel $P_5$ is the third pixel $P_3$ indicating B. The third pixel $P_3$ is placed in the right center N.

The first pixel $P_1$, the third pixel $P_3$ and the fifth pixel $P_5$ have Bayer color of B. The second pixel $P_2$ and the fourth pixel $P_4$ have Bayer color of G. Meanwhile, the window (W) can be simply formed by using five shift resistors. Concealment of the dark defect is first performed to the third pixel $P_3$ and then, the concealment of the dark defect is performed to the fourth pixel $P_4$ indicating G placed next to the center N+1.

In the installed window (W), an average value '$\alpha$' is calculated by using the first pixel $P_1$ and the fifth pixel $P_5$ having the Bayer color of B identical with the Bayer color of the third pixel $P_3$ and a plurality of '$\alpha$/n' are calculated by the average value '$\alpha$' divided by 'n' that is a multiple of 2 at step S102.

Herein, the average value '$\alpha$' is the average value of the first pixel $P_1$ and the fifth pixel $P_5$ so that the average value can be denoted with a condition of $(P_1+P_5)/2$. At this time, values denoted with the first pixel $P_1$ and the fifth pixel $P_5$ are codes, i.e., voltages, corresponding to the values of the first pixel $P_1$ and the fifth pixel $P_5$ among values of the code from 1 to 255, for instance, in case of expressing the value of the pixel data in an 8 bit.

Meanwhile, if the dark defect of the third pixel $P_3$ is discriminated only with the average value '$\alpha$', a serious problem is generated. For instance, the first pixel $P_1$ and the fifth pixel $P_5$ have the values of the codes, 129 and 131, respectively, thereby having the average value '$\alpha$', 130. At this time, if the value of the code of the third pixel $P_3$ is 131, the value of the code of the third pixel $P_3$, 131 is greater than the average value '$\alpha$' of the first pixel $P_1$ and the fifth pixel $P_5$, 130. Accordingly, it is concluded that the third pixel $P_3$ is the dark defect.

Furthermore, in an extreme way, if the dark defect of the third pixel $P_3$ is discriminated with '2$\alpha$' that is two times more than the average value '$\alpha$', the first pixel $P_1$ and the fifth pixel $P_5$ have the values of the codes, 59 and 61, respectively. Accordingly, '2$\alpha$' is 120. At this time, if the value of the code of the third pixel $P_3$ is 119, the average value '$\alpha$', 120 is greater than the value of the code of the third pixel $P_3$, 119, thereby concluding that the third pixel $P_3$ is not the dark defect.

However, these two embodiments described above are not enough to discriminate the dark defect.

Accordingly, in accordance with the present invention, to discriminate the dark defect more precisely, a threshold value ($V_T$) is used as a discriminating standard of the dark defect. Herein, the threshold value ($V_T$) is calculated by adding '$\alpha$/n' obtained by the average value '$\alpha$' divided by 'n' that is the multiple of 2, i.e., '$\alpha$/2' and '$\alpha$/4', to the average value '$\alpha$'.

Accordingly, n is made to be selectively changed according to a low luminance of an image.

In case of that a value of 'n' is large, the threshold value ($V_T$) decreases. Thus, there is an advantage of more precisely detecting the dark defect. However, in this case, the concealment of the dark defect is more frequently generated, thereby inducing a deterioration of an image quality. Accordingly, it is preferable to decide the value of n selectively according to a luminance of the image.

Figure 4:
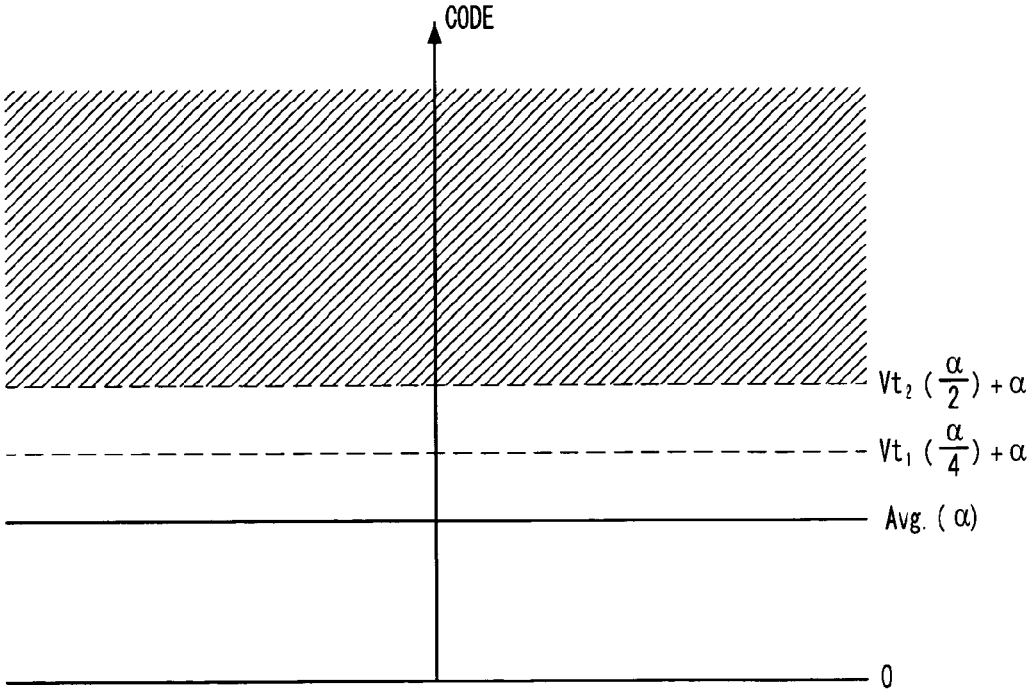
FIG. 4 is a graph illustrating a dark defect discriminating region by using an average value '$\alpha$' and a threshold value '$\alpha+\alpha/n$' in accordance with the present invention.

FIG. 4 is a graph illustrating a dark defect discriminating region by using an average value '$\alpha$' and a threshold value '$\alpha+\alpha$/n' in accordance with the present invention.

Referring to FIG. 4, the average value '$\alpha$' and two threshold values are exemplified. Herein, a first threshold value $V_{T1}$ is calculated by '$\alpha+\alpha/2$' and a second threshold value $V_{T2}$ is calculated by '$\alpha+\alpha/4$'. In case of that the value of the code of the third pixel $P_3$ is an oblique lined region greater than either the first threshold value $V_{T1}$ or the second threshold value $V_{T2}$, it is concluded that the third pixel $P_3$ is the dark defect pixel and this dark defect is concealed. As for the concealment of the dark defect, a method for replacing the third pixel $P_3$ with the average value '$\alpha$' of the $P_1$ and the $P_5$ is used.

Subsequently, a threshold value applied to the present pixel is selected between the two threshold values $V_{T1}$ and $V_{T2}$ at step S103. Afterwards, the size of the value of the code is compared with the size of the threshold value of at step S104.

As a result of the comparison, if the value of the code of the corresponding pixel that is the third pixel $P_3$ is smaller than the threshold value of the third pixel $P_3$, the corresponding pixel that is the third pixel $P_3$ does not generate a dark defect. Accordingly, a dark defect concealment is omitted at step S106.

Meanwhile, if the value of the code of the third pixel $P_3$ is greater than the threshold value of the third pixel $P_3$, the corresponding pixel that is the third pixel $P_3$ is concluded as a pixel generating the dark defect for a moment.

Figure 5:
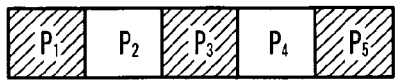
FIG. 5 is a diagram illustrating an embodiment of detecting a dark defect within an installed window in accordance with the present invention.

FIG. 5 is a diagram illustrating an embodiment of detecting a dark defect within an installed window.

Referring to FIG. 5, the third pixel $P_3$ that is the pixel corresponding to detect the dark defect has an identical Bayer color with the first pixel $P_1$ and the fifth pixel $P_5$. The second pixel $P_2$ and the fourth pixel $P_4$ also have the identical Bayer color with each other.

Accordingly, ① denotes the average value $\alpha$, ② denotes the threshold value '$\alpha+\alpha/2$' and ③ denotes the threshold value '$\alpha+\alpha/4$'.

At this time, when both of the first pixel $P_1$ and the fifth pixel $P_5$ have the value of the code, 10, the threshold value is 12.5 in case of using the threshold value calculated by ③. Accordingly, the value of the code of the third pixel $P_3$ is 15, thereby being greater than 12.5 that is the threshold value calculated by ③. Thus, in this case, it is concluded that the third pixel $P_3$ is the dark defect for a moment.

Meanwhile, if an edge exists in an actual image, situations become different.

That is, if the third pixel $P_3$ is concluded to be the dark defect as shown in FIG. 5, it may be possible that the edge actually exists in this portion, thereby changing the value of the code.

Accordingly, in case of that the value of the code of the corresponding pixel is greater than the threshold value, whether the edge exists or not within the window is judged at step S106.

Figure 6:
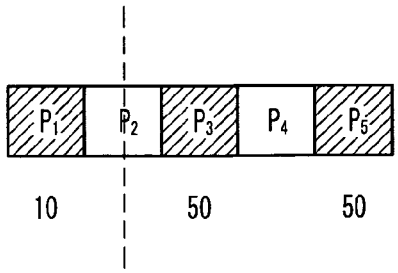
FIG. 6 is a diagram illustrating an embodiment showing an edge existing within an installed window in accordance with the present invention.

FIG. 6 is a diagram illustrating an embodiment showing an edge existing within an installed window.

Referring to FIG. 6, if the first pixel $P_1$ and the fifth pixel $P_5$ have the values of the codes, 10 and 50, respectively and the third pixel $P_3$ has the value of the code, 50, the average value $\alpha$ becomes 30 due to the condition of $(P_1+P_5)/2$. If the threshold value corresponding to ③ shown in FIG. 5 is applied, the threshold value is $5\alpha/4$, thereby becoming 37.5.

Accordingly, the value of the code of the third pixel $P_3$, 50 is greater than the threshold value, 37.5, the third pixel $P_3$ is concluded to be the dark defect. However, in case of this window, the edge exists in a region denoted with a dotted line so that the first pixel $P_1$ and the third pixel $P_3$ have the values of the codes having a big difference between them. In this case, if the concealment of the dark defect is performed after concluding the dark defect, the image quality is deteriorated. Thus, it is important to understand an existence of the edge with respect to the corresponding window.

For understanding the existence of the edge, an edge discriminating zone is set, thereby checking the existence of the edge by using this edge discriminating zone.

Figure 7:
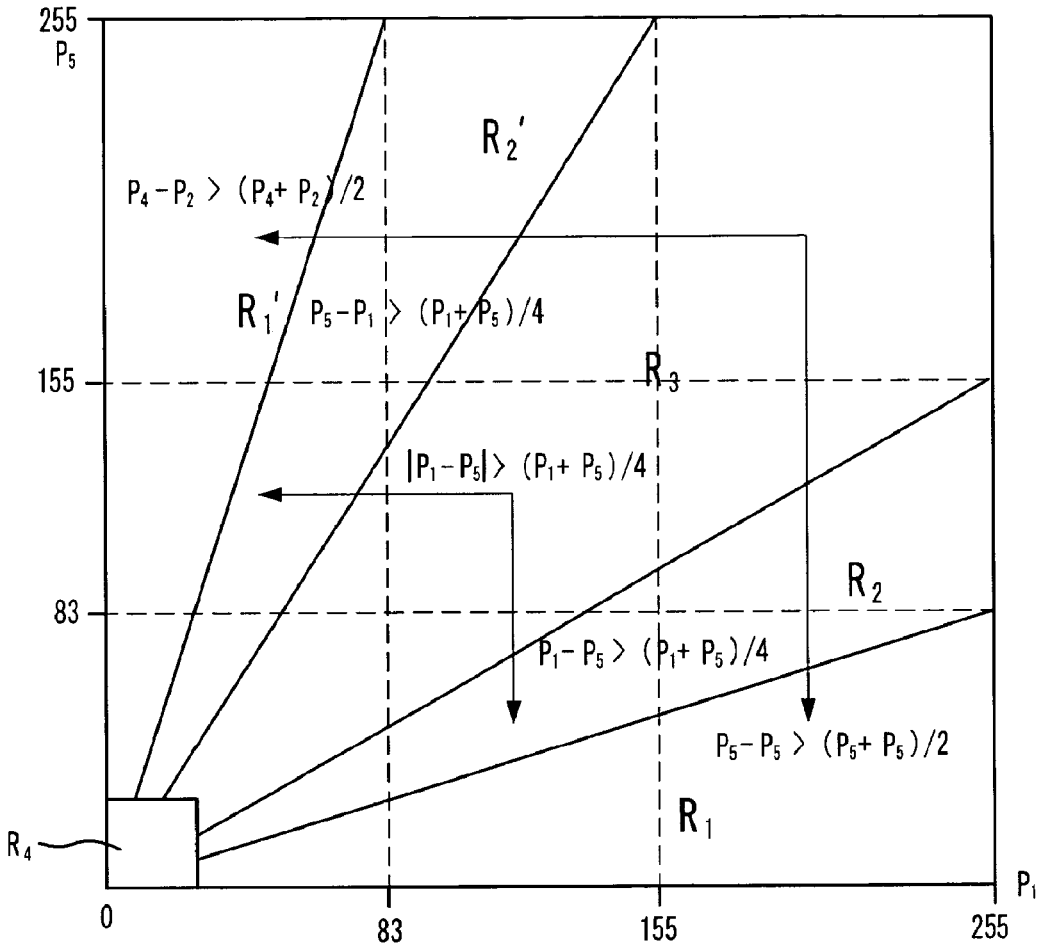
FIG. 7 is a diagram illustrating an edge discriminating zone.

FIG. 7 is a diagram illustrating the edge discriminating zone.

In FIG. 7, a horizontal axis denotes the value of the code of the first pixel $P_1$ and a vertical axis denotes the value of the fifth pixel $P_5$ as for a method for expressing data in an 8 bit.

Referring to FIG. 7, a condition of $P_4-P_2>(P_4+P_2)/2$ is defined in a $R_1'$ region. If this condition is solved, a new condition of $P_4>3P_2$ is obtained. Also, a condition of $P_2-P_4>(P_2+P_4)/2$ is defined in a R1 region. If this condition is solved, a new condition of $P_2>3P_4$ is obtained. These two regions can be expressed with another condition of $|P_2-P_4|>(P_4+P_2)/2$.

That is, in the relationship between the second pixel $P_2$ and the fourth pixel $P_4$ adjacent to the third pixel $P_3$, one value of the code is three times greater than the other value of the code so that it is realized that the edge exists in this region.

Furthermore, a condition of $P_5-P_1>(P_5+P_1)/4$ is defined in a $R_2'$ region. If this condition is solved, a new condition of $P_5>5/3P_1$ is obtained. Also, a condition of $P_1-P_5>(P_1+P_5)/4$ is defined in a $R_2$ region. If this condition is solved, a new condition of $P_1>3P_5$ is obtained. These two regions can be expressed with another condition of $|P_5-P_1|>(P_5+P_1)/4$.

That is, in the relationship between the first pixel $P_1$ and the fifth pixel $P_5$ having the identical bayer color with the third pixel $P_3$, one value of the code is five thirds times greater than the other value of the code so that it is realized that the edge exists in this region. In case of that value of the code of the third pixel $P_3$ is falling under the four regions, $R_1$, $R_1'$, $R_2$ and $R_2'$, even though the value of the code of the third pixel $P_3$ exceeds the threshold value, the concealment of the dark defect is omitted at step S105.

Meanwhile, in case of a $R_3$ region that is not corresponding to the aforementioned four regions, since the edge does not exist in the corresponding window, the concealment of the dark defect is decided by a comparison between the value of the code of the third pixel $P_3$ and the threshold value.

That is, if the code value of the third pixel $P_3$ is greater than the threshold value and the edge does not exist, the third pixel $P_3$ is decided to be a defect pixel, thereby performing the concealment of the dark defect with respect to the third pixel $P_3$.

Meanwhile, in the image with an extremely low luminance, even though there is a little bit of difference in the values of the codes of the first pixel $P_1$, the second pixel $P_2$, the third pixel $P_3$, the fourth pixel $P_4$ and the fifth pixel $P_5$, it is judged as the edge, thereby not performing the concealment of the dark defect. As described above, a region where the values of the codes of both the first pixel $P_1$ and the fifth pixel $P_5$ are less than a predetermined value of the code is defined as a blocking zone, $R_4$ to prevent a region where the edge does not actually exist from being judged as the edge since the region where the edge does not actually exist satisfies with the condition of $|P_2-P_4|>(P_2+P_4)/2$ or $|P_1-P_5|>(P_1+P_5)/2$.

Accordingly, if the values of the codes of the first pixel $P_1$ and the fifth pixel $P_5$ are falling under the blocking zone, $R_4$, the concealment of the dark defect with respect to the third pixel $P_3$ is unconditionally performed.

At this time, in case of that a maximum critical value of the blocking zone, $R_4$ ranges from approximately 7 to approximately 32 in case of that the method for expressing the data of the 8 bit is a 255 code.

Figure 8A:
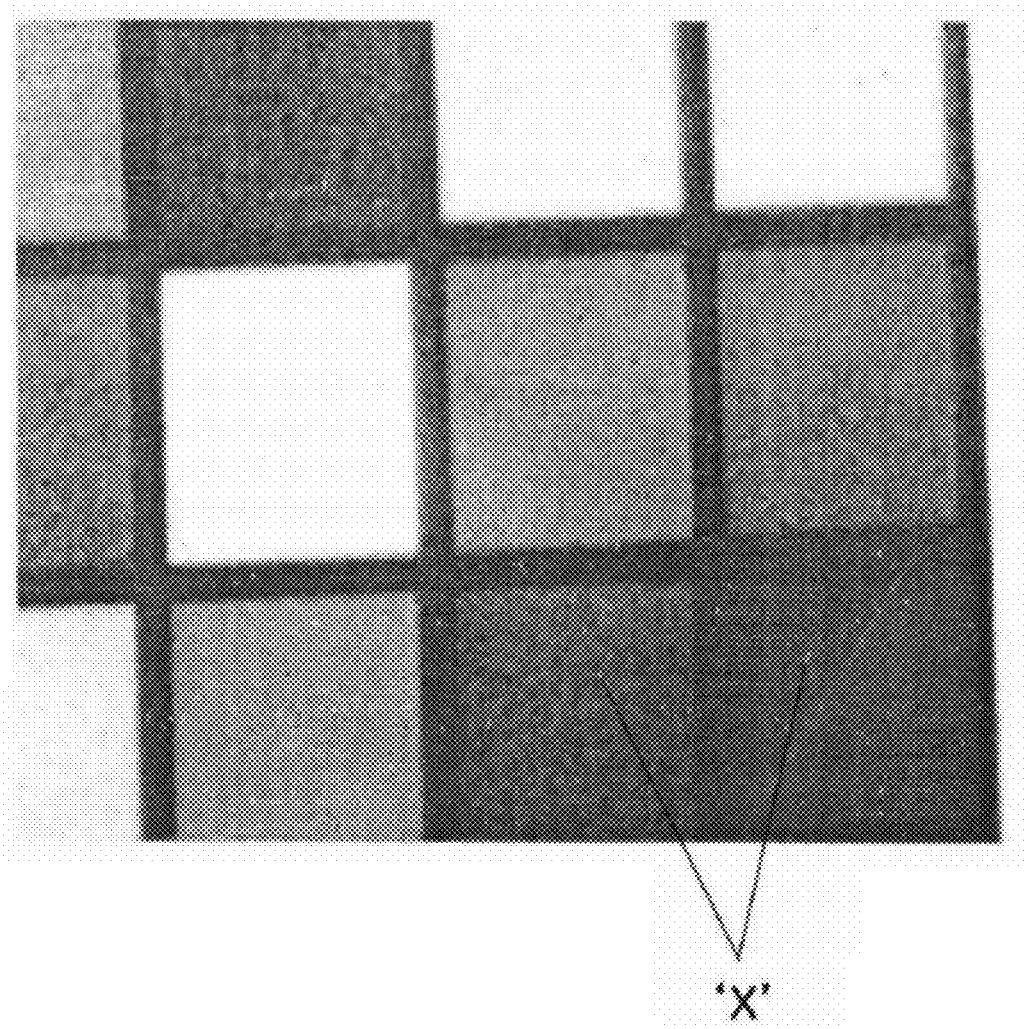
FIGS. 8A and 8B are photographs of transmission electron microscopy (TEM) illustrating an image quality improvement of an image sensor in case of applying a method for concealing a dark defect in accordance with the present invention.
Figure 8B:
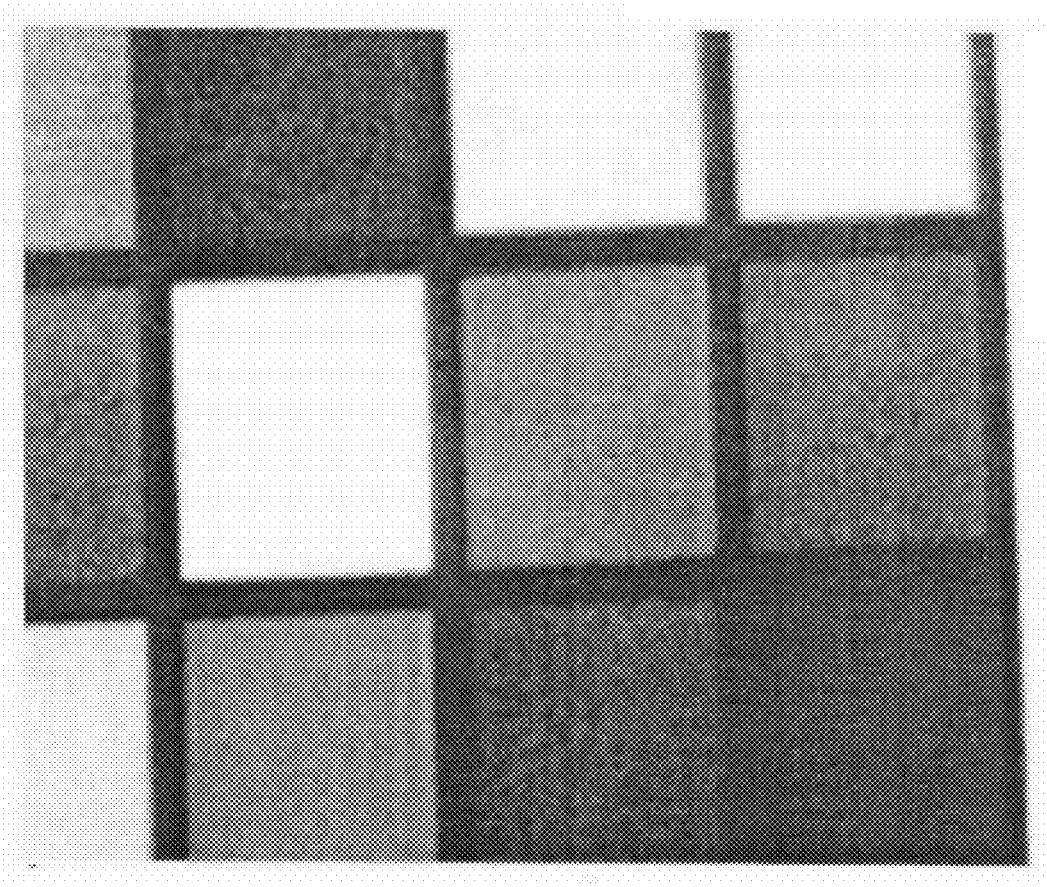

FIGS. 8A and 8B are photographs of transmission electron microscopy (TEM) illustrating an image quality improvement in case of applying the concealment of the dark defect in accordance with the present invention.

FIG. 8A illustrates a photograph before the image quality improvement, thereby observing a plurality of defects such as 'X' in the image. However, FIG. 8B illustrates a photograph after the image quality improvement, thereby observing that the defects are almost removed.

Meanwhile, in accordance with the embodiment of the present invention, although the pixel data comprised of the format of a red color, a green color and a blue color are exemplified, a format of complementary colors such as a yellow color, a magenta color and a cyan color can be applied.

The present invention performed as described above forms a window with a size of 1×5 by using a simple hardware constitution such as a shift resistor for sequentially outputting image pixel data. At this time, an average value and a threshold value are determined by using pixels having an identical color with a corresponding pixel in each window and then, a dark defect is judged by comparing the average value and the threshold value. Thus, a concealment of the dark defect is selectively performed, thereby judging an existence of an edge by using values of the adjacent pixels having the identical color and not having the identical color during judging the dark defect. In case of that the values of the pixels having the identical color within the window are less than a predetermined value, a blocking zone is set and thus, it is possible to improve an image quality by increasing precision during judging the dark defect and discriminating the edge.

The present invention provides an effect of improving an image quality of image data of an image sensor by minimizing a deterioration of the image through a concealment of a dark defect.

The present application contains subject matter related to the Korean patent application No. KR 2004-0029070, filed in the Korean Patent Office on Apr. 27, 2004, the entire contents of which being incorporated herein by reference.

While the present invention has been described with respect to certain preferred embodiments, it will be apparent to those skilled in the art that various changes and modifications may be made without departing from the spirit and scope of the invention as defined in the following claims.

What is claimed is:

1. A method for concealing a dark defect in an image sensor, comprising the steps of:

setting a window including five sequential pixels, a first pixel $P_1$, a second pixel $P_2$, a third pixel $P_3$, a fourth $P_4$ and a fifth pixel $P_5$, from a plurality of pixel data sequentially outputted, the third pixel and the fifth pixels $P_3$ and $P_5$ being identical in Bayer color with each other and the second and the fourth pixels $P_2$ and $P_4$ being identical in Bayer color with each other;

calculating an average value '$\alpha$' of the first and the fifth pixels $P_1$ and $P_5$ and a plurality of '$\alpha/n$' obtained by dividing the average value '$\alpha$' by 'n', 'n' being a multiple of 2;

selecting one of the plurality of '$\alpha/n$';

comparing a threshold value '$\alpha+\alpha/n$' calculated by adding the average value '$\alpha$' to the selected '$\alpha/n$' with a value of the third pixel $P_3$ in size; and omitting a concealment of the dark defect *in the image sensor* when the threshold value '$\alpha+\alpha/n$' is greater than the value of the third pixel $P_3$.

2. The method of claim 1, wherein further including a step of judging whether the edge exists or not within the window by the comparison result.

3. The method of claim 2, wherein in the step of judging the edge, the concealment of the dark defect is omitted when the comparison result represents the existence of the edge within the window.

4. The method of claim 3, wherein if one of conditions of $|P_2-P_4|>(P_2+P_4)/2$ and $|P_1-P_5|>(P_1+P_5)/4$ is satisfied, it is judged that the edge exists within the window.

5. The method of claim 4, wherein even though the edge exists within the window by satisfying one of the conditions of $|P_2-P_4|>(P_2+P_4)/2$ and $|P_1-P_5|>(P_1+P_5)/4$, as the values of the first and the fifth pixels $P_1$ and $P_5$ are falling under a blocking zone having a less value than a predetermined value, the concealment of the dark defect is performed.

6. The method of claim 5, wherein the predetermined value ranges from approximately 7 to approximately 32 in case of a 255 code of an 8 bit.

7. The method of claim 1, wherein at the step of selecting one of the plurality of '$\alpha/n$', a detecting capability of the dark defect increases and an image quality degrades as a value of 'n' increases.

8. The method of claim 1, wherein the pixel data is comprised of a format of a red color (R), a green color (G) and a blue color (B).

9. A method for concealing a dark defect in an image sensor, comprising the steps of:

extracting a window including five sequential pixels, a first pixel $P_1$, a second pixel $P_2$, a third pixel $P_3$, a fourth $P_4$ and a fifth pixel $P_5$, from a plurality of pixel data sequentially outputted, the third and the fifth pixels $P_3$ and $P_5$ being identical in Bayer color with each other and the second and the fourth pixels $P_2$ and $P_4$ being identical Bayer color with each other;

calculating an average value '$\alpha$' of the first and the fifth pixels $P_1$ and $P_5$ and a plurality of '$\alpha/n$' obtained by dividing the average value '$\alpha$' by 'n', 'n' being a multiple of 2;

selecting one of the plurality of '$\alpha/n$';

comparing a threshold value '$\alpha+\alpha/n$' calculated by adding the average value '$\alpha$' to the selected '$\alpha/n$' with a value of the third pixel $P_3$ in size;

judging an existence of an edge within the window by using the comparison result; and performing the concealment of the dark defect *in the image sensor* when the comparison result is affirmative.

10. The method of claim 9, wherein in the step of judging the existence of the edge in the window, the concealment of the dark defect with respect to the third pixel $P_3$ is performed as both of the first and the fifth pixels $P_1$ and $P_5$ are falling under a blocking zone having a value less than a predetermined value even though the edge exists in the window by satisfying one of conditions of $|P_2-P_4|>(P_2+P_4)/2$ and $|P_1-P_5|>(P_1+P_5)/4$.

11. The method of claim 10, wherein the predetermined value ranges from approximately 7 to approximately 32 in case of a 255 code of an 8 bit.

12. The method of claim 9, wherein at the step of selecting one of the plurality of '$\alpha/n$', a detecting capability of the dark defect increases and an image quality degrades as a value of n increases.

13. The method of claim 9, wherein the pixel data is comprised of a format of a red color (R), a green color (G) and a blue color (B).

*14. A method for correcting pixel data in an image sensor, the method comprising:*

*calculating a first threshold and a second threshold;*

*determining a luminance value of an image from the image sensor, wherein the image comprises a first pixel having a first pixel value, a second pixel having a second pixel value, and a third pixel having a third pixel value;*

*selecting one of the first threshold and the second threshold to form a selected threshold according to the luminance value; and*

*concealing a dark defect in the image sensor if the second pixel value is greater than the selected threshold.*

*15. The method of claim 14, further comprising:*

*judging an existence of an edge in the window; and*

*omitting the step of concealing a dark defect if the edge exists.*

*16. The method of claim 14, wherein each of the first threshold and the second threshold are proportional to an average value of the first pixel value and the third pixel value.*

*17. The method of claim 14, wherein the first pixel and the second pixel are separated by a pixel having a different color; and*

*wherein the second pixel and the third pixel are separated by another pixel having a different color.*

*18. A method for correcting pixel data in an image sensor, the method comprising:*

*calculating a first threshold and a second threshold;*

*wherein the first threshold and the second threshold are each proportional to an average value of a first pixel value and a third pixel value;*

*selecting one of the first threshold and the second threshold to form a selected threshold; and*

*concealing a dark defect in the image sensor if a second pixel value is greater than the selected threshold;*

*wherein each of the first pixel value, the second pixel value, and the third pixel value are representative of a first color.*

*19. The method of claim 18, further comprising:*

*determining a luminance of an image comprising the first pixel value, the second pixel value, and the third pixel value; and*

*wherein the step of selecting one of the first threshold and the second threshold is performed according to the luminance.*

* * * * *

UNITED STATES PATENT AND TRADEMARK OFFICE

CERTIFICATE OF CORRECTION

PATENT NO. : RE43,853 E
APPLICATION NO. : 12/713040
DATED : December 11, 2012
INVENTOR(S) : Jo It is certified that error appears in the above-identified patent and that said Letters Patent is hereby corrected as shown below:

In the Specification

In Column 5, Line 22, delete "R1" and insert -- $R_1$ --, therefor.

In the Claims

In Column 7, Line 11, in Claim 4, delete "one of conditions" and insert -- one of the conditions --, therefor.

In Column 7, Line 57, in Claim 10, delete "one of conditions" and insert -- one of the conditions --, therefor.

Signed and Sealed this
Eighteenth Day of June, 2013

Teresa Stanek Rea
*Acting Director of the United States Patent and Trademark Office*